Oct. 6, 1959     M. C. SHELSWELL     2,907,599
LATCHING DEVICES FOR TAIL GATES ON LIVESTOCK TRUCKS
Filed June 19, 1957

Inventor
M. C. Shelswell

United States Patent Office 2,907,599
Patented Oct. 6, 1959

2,907,599

LATCHING DEVICES FOR TAIL GATES ON LIVESTOCK TRUCKS

Morris C. Shelswell, Hawkestone, Ontario, Canada

Application June 19, 1957, Serial No. 666,716

1 Claim. (Cl. 292—36)

This invention relates to improvements in latching devices for tail gates on live-stock trucks, and one object of the invention is to provide a positive fastener, especially at the top and bottom portions of a tail gate of a truck used particularly for transporting live-stock, so that the stablility of the gate may not be affected by outward pressure exerted against the gate by the bodies of the live-stock within the truck, as this latter is in motion.

Another object of the invention is to produce a device that while manually latched and unlatched, cannot be unlatched by the pressure against the gate of the bodies of the beasts transported by the truck, nor by any jarring or bumping of the truck itself in motion, as hereinafter more particularly explained.

In the drawings, like characters of reference refer to the same parts.

Figures 1, 2, 3:
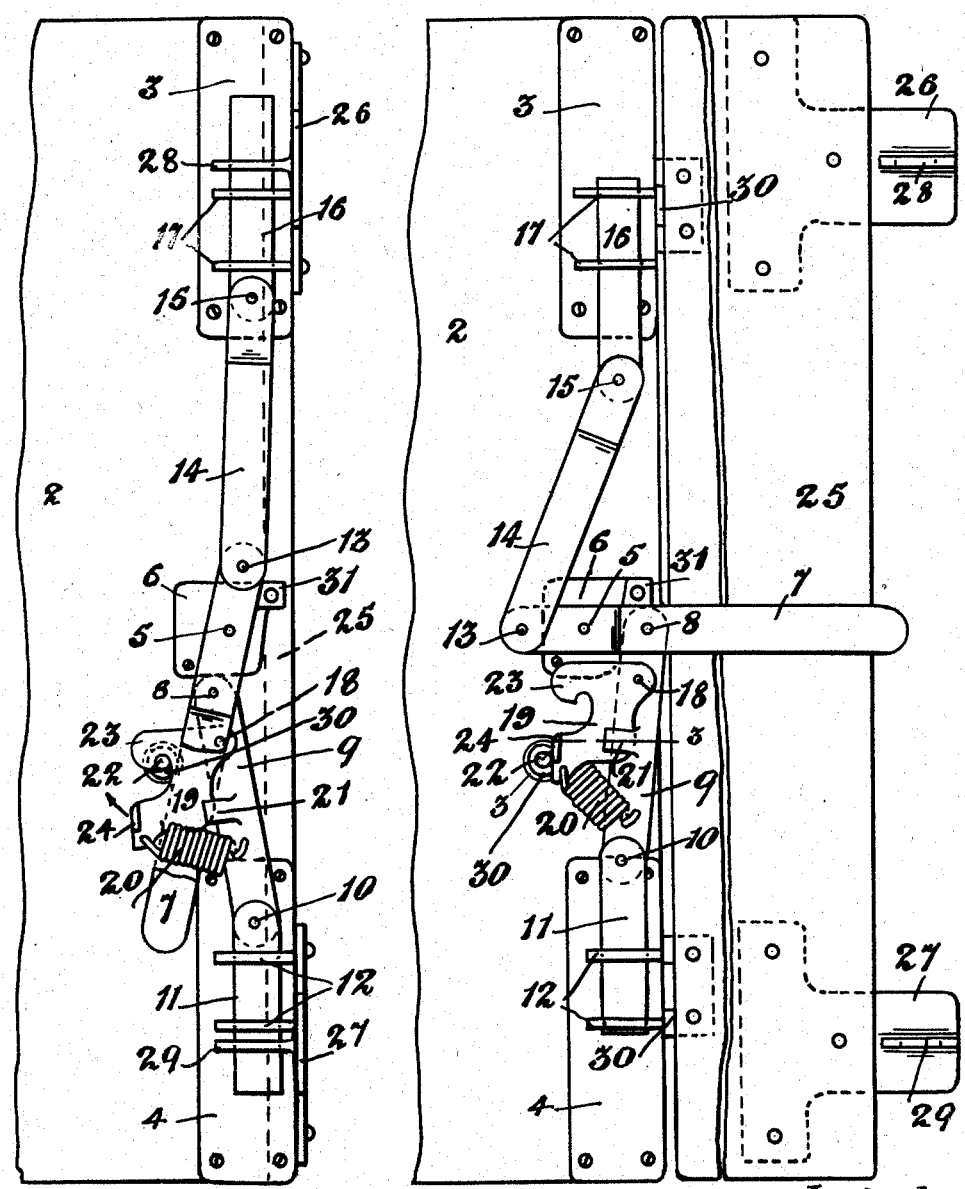
Fig. 1 is a side elevation of a portion of a truck body showing a side view of the latching device attached thereto and latching the tail gate closed.
Fig. 2 is a view similar to Fig. 1, but showing the latching means disengaged from the tail gate, the latter being shown open.
Fig. 3 is a horizontal section on the line 3—3, Fig. 2.

In this specification and the claims forming part thereof, the term "bolt" is used to identify elements in the form of flat plates that are moved longitudinally thereof to perform their functions. But this term is not used in a restricted sense; it includes a bolt in the form of a rod or bar.

The side 2 of the body of the truck carries exteriorly most of the elements of this device, and these consist of top and bottom plates 3 and 4, positioned vertically in alignment and secured to the truck body by any suitable means.

Pivoted at 5 to one side of the truck, preferably through the medium of a plate 6, suitably carried by said side, is a lever 7, and pivoted to this lever at 8, is a link 9, which in turn is pivoted at 10 to a bolt 11 which vertically operates through an eye positioned, in alignment, in each of the keeper plates 12, carried in spaced vertical relationship by the plate 4. Pivoted at 13 to the lever 7 is a link 14 which in turn is pivoted at 15 to the bolt 16 which vertically operates through an eye positioned in alignment in each of the keeper plates 17 carried in spaced vertical relationship by the plate 3. Pivoted at 18 to the link 9 is a latch 19, the lower portion of which is coupled by a spring 20 to the link 9. The latch 19 is located between the link 9 and the keeper 21, carried, chiefly in spaced relationship thereto, by said link 9. The said latch is freely moved between the keeper 21 and link 9, but is always positioned behind the said keeper.

Fixedly carried by the side 2 of the body of the truck, is a stout pin 22 which is engaged by the hook 23 of the latch 19 when the gate of the truck is latched closed (Fig. 1). By means of the spring 20, the hook 23 is normally snugly held in engagement with the pin 22 and cannot be moved away therefrom through any jarring of the vehicle or pressure against the tail gate, at any time.

To move the hook 23 away from the pin 22, manual pressure, against the arm 24 carried by the latch 19, in the direction of the arrow in Fig. 1, will move the latch 19 and shift the beak of the hook 23 over and away from the pin 22, at the same time extending the spring 20. As the lever 7 is manually simultaneously moved upward around its pivot 5, the hook 23 passes by the pin 22, it is moved further upward and away from this pin as the link 9 is moved to the right until the elements just identified are finally moved into the positions shown in Fig. 2.

As the link 14 is moved downward by the lever arm 7, the bolt 16 sliding in an aligned eye in each of the keeper plates 17, is moved into the position shown in Fig. 2.

The gate 25 is suitably hinged, as at 30, to the body of the truck, and is provided with the plates 26 and 27. Carried by and extending beyond the inner side of the plate 26, is a keeper plate 28, and 29 is a keeper plate carried by and extending beyond the inner side of the plate 27.

When the gate 25 is closed, the bolt 16 passes through the eye in the keeper plate 28 (Fig. 1) and the bolt 11 passes through the eye of the keeper plate 29 carried by the plate 27 (Fig. 1), thus locking the gate 25 closed.

The gate is unlocked and may be opened when the bolts 11 and 16 occupy the positions shown in Fig. 2.

According to the preferred construction shown in Fig. 3, the latch 19 slides between the link 9 and the keeper 21, carried by this link and slides over a plate 30 suitably fastened to the truck body and through which the pin 22 passes. Thus the path of this latch is smooth and durable.

As the elements described are returned to the positions shown in Fig. 1, the hook 23 engages the pin 22 and so extends the spring 20 so that as this hook is moved over the pin 22 and back to normal position, the spring 20 contracts, thus positively holding the said hook closely in contact with the pin 22.

Carried by or forming a part of the plate 6, is a stop 31, the function of which (Fig. 2) is to limit the range of the upward movement of the lever 7.

Changes in shape of the parts shown in the drawings may be made without departing from the spirit of this invention and the scope of the claim.

I claim:

The combination with a wall of a truck, the gate hinged thereto, and a pin carried by said wall, of a latching device for said gate when the latter is closed, comprising a lever pivoted to said wall; link means extending above said lever and pivoted to the outer end thereof in spaced relation to the pivot of said lever; separable means on each side of said lever carried in part by said truck body and in part by said gate; link means extending below and pivoted to said lever in spaced relation to the pivot point of said first-mentioned link means to said lever, each of said separable means adapted to be engaged by one of said link means; a hook-provided latch pivoted to said second-mentioned link means below said lever, and a spring coupling said latch to said second-mentioned link means, the said latch adapted to be moved as said lever is moved downward to engage its hook with said pin to latch said gate closed as both of said link means are moved into engagement with their respective separable means to lock said gate closed.

References Cited in the file of this patent

UNITED STATES PATENTS

| | | |
|---|---|---|
| 138,360 | Arnold | Apr. 29, 1873 |
| 1,204,396 | Boon | Nov. 14, 1916 |
| 1,207,116 | Winner | Dec. 5, 1916 |
| 1,727,619 | Slama | Sept. 10, 1929 |
| 1,964,114 | Gerlach et al. | June 26, 1934 |
| 2,489,957 | Davis | Nov. 29, 1949 |
| 2,793,892 | Hutterer | May 28, 1957 |